US007865387B2

(12) United States Patent
Mansour

(10) Patent No.: US 7,865,387 B2
(45) Date of Patent: Jan. 4, 2011

(54) METHOD AND SYSTEM FOR SCHEDULING A MEETING FOR A SET OF ATTENDEES VIA A SPECIAL ATTENDEE

(75) Inventor: Steve Mansour, Milpitas, CA (US)

(73) Assignee: AOL Inc., Dulles, VA (US)

( * ) Notice: Subject to any disclaimer, the term of this patent is extended or adjusted under 35 U.S.C. 154(b) by 1492 days.

(21) Appl. No.: 10/155,625

(22) Filed: May 23, 2002

(65) Prior Publication Data

US 2003/0220826 A1     Nov. 27, 2003

(51) Int. Cl.
G06Q 10/00 (2006.01)

(52) U.S. Cl. ............................................. 705/9; 705/8

(58) Field of Classification Search ...................... 705/9
See application file for complete search history.

(56) References Cited

U.S. PATENT DOCUMENTS

| 4,807,154 A | 2/1989 | Scully et al. ................ 364/518 |
| 4,807,155 A | 2/1989 | Cree et al. .................. 364/518 |

(Continued)

FOREIGN PATENT DOCUMENTS

EP          323 703        7/1989

(Continued)

OTHER PUBLICATIONS

Bee Staff Reports, Governor wants to meet with refugee leaders, Modesto Bee, Mar. 5, 1989, p. 2B.*

(Continued)

*Primary Examiner*—Beth V Boswell
*Assistant Examiner*—Justin M Pats
(74) *Attorney, Agent, or Firm*—Finnegan, Henderson, Farabow, Garrett & Dunner, L.L.P.

(57) ABSTRACT

A group scheduling solution offers an organized and formalized solution to the time management problem in which the desired meeting includes one person who is difficult to schedule. In the inventive approach, a scheduling system is provided in which a hard-to-schedule attendee takes over responsibility for setting the start time of an event. In the invention, a workflow is provided, in which the organizer sends a request to the hard-to-schedule person. The request preferably contains the desired duration of the meeting. The request may contain a list of attendees, location, and other details. These requests are maintained in a queue for the hard-to-schedule person. Batching requests in a queue is a key feature of the invention. The hard-to-schedule person, or their proxy, can then review these requests and select a suitable time for the meeting, set this time in a meeting request, thereby causing an update to be sent back to the organizer and the other attendees, thus indicating the appointed time for the meeting. The organizer of the meeting can still update the meeting details, etc. However, any changes in the start time or the duration of the meeting must be made by the hard-to-schedule person or their proxy. The hard-to-schedule person can also decline the meeting entirely.

27 Claims, 2 Drawing Sheets

U.S. PATENT DOCUMENTS

| | | | | |
|---|---|---|---|---|
| 4,817,018 | A | 3/1989 | Cree et al. | 364/518 |
| 4,819,191 | A | 4/1989 | Scully et al. | 364/518 |
| 4,831,552 | A | 5/1989 | Scully et al. | 364/518 |
| 4,866,611 | A | 9/1989 | Cree et al. | 364/300 |
| 4,977,520 | A | 12/1990 | McGaughey, III et al. | 364/521 |
| 5,023,851 | A | 6/1991 | Murray et al. | 368/41 |
| 5,124,912 | A * | 6/1992 | Hotaling et al. | 705/9 |
| 5,129,057 | A | 7/1992 | Strope et al. | 395/161 |
| 5,261,045 | A | 11/1993 | Scully et al. | 395/161 |
| 5,457,476 | A | 10/1995 | Jenson | 345/146 |
| 5,948,040 | A | 9/1999 | DeLorme et al. | 701/201 |
| 5,960,406 | A | 9/1999 | Rasansky et al. | 705/9 |
| 6,018,343 | A | 1/2000 | Wang et al. | 345/356 |
| 6,047,260 | A * | 4/2000 | Levinson | 705/9 |
| 6,092,067 | A | 7/2000 | Girling et al. | 707/100 |
| 6,111,572 | A | 8/2000 | Blair et al. | 345/333 |
| 6,216,110 | B1 | 4/2001 | Silverberg | 705/9 |
| 6,266,814 | B1 | 7/2001 | Lemmons et al. | 725/44 |
| 6,275,810 | B1 | 8/2001 | Hetherington et al. | 705/9 |
| 6,278,456 | B1 | 8/2001 | Wang et al. | 345/356 |
| 6,345,260 | B1 * | 2/2002 | Cummings et al. | 705/8 |
| 7,174,303 | B2 * | 2/2007 | Glazer et al. | 705/9 |
| 7,177,905 | B1 * | 2/2007 | Slutsman et al. | 709/204 |
| 7,188,073 | B1 * | 3/2007 | Tam et al. | 705/9 |
| 7,283,970 | B2 * | 10/2007 | Cragun et al. | 705/8 |
| 7,587,327 | B2 * | 9/2009 | Jacobs et al. | 705/8 |
| 2001/0027481 | A1 * | 10/2001 | Whyel | 709/218 |
| 2001/0054072 | A1 * | 12/2001 | Discolo et al. | 709/206 |
| 2002/0035493 | A1 * | 3/2002 | Mozayeny et al. | 705/5 |
| 2003/0036941 | A1 * | 2/2003 | Leska et al. | 705/9 |

FOREIGN PATENT DOCUMENTS

| | | |
|---|---|---|
| EP | 276 424 | 11/1993 |
| EP | 276 425 | 11/1993 |
| EP | 276 426 | 11/1993 |
| EP | 276 428 | 11/1993 |
| EP | 276 429 | 11/1993 |
| EP | 326 778 | 9/1996 |
| EP | 1 122 672 | 8/2001 |

OTHER PUBLICATIONS

Take A Number Systems, Turn-O-Matic, retrieved from web.archive.org, Oct. 25, 2001, http://web.archive.org/web/20011025045226/takeanumbersystems.com/take.asp.*

Cybozu Office 4 Support, http://www.share360.com/ support/office4/manuals/Updates_-_Linux.all.html (product publicly available as of st Mar. 13, 2002).*

Padwick and Feddema, Using Microsoft Outlook 2000, Que Publishing, May 12, 1999, p. 1-93.*

Syroid and Leuf, Outlook 2000 in a Nutshell, O'Reilly Media, Inc., May 2, 2000 (online reprint p. 1-28).*

Padwick and Feddema, Special Edition Using Microsoft Outlook 2000, Que Publishing, May 12, 1999 (online reprint p. 1-17).*

Bott and Leonhard, Special Edition using Microsoft Office 2000, Que Publishing, 1999, p. 772-78.*

Muna, message to mailing list, [Imc-richmond] coordinating schedules = meetings, lists.indymedia.org, Sep. 2001, http://archives.lists.indymedia.org/ imc-richmond/2001-September/000306.html.*

Syroid and Leuf, Outlook 2000 in a Nutshell, O'Reilly Media, Inc., May 2, 2000 (online reprint p. 1-15).*

*A Groupware Environment for Complete Meetings* Ted O'Grady and Saul Greenberg; The University of Calgary.

*Cognitive Modeling and Group Adaption in Inteligent Multi-Agent Meeting Scheduling*; Leonardo Garrido, Ramon Brena, and Katia Sycara.

Office Monitor; Nicloe Yankelovich and Cynthia D. McLain; CHI 1996 Conference on Human Factors in Computing Systems; Apr. 14-18, 1996.

*A Non-Manipulable Meeting Scheduling System*; Eithan Ephrati, Gilad Zlotkin, and Jeffery S. Rosenschein.

*Multi-Agent Meeting Scheduling: Preliminary Experimental Results*; Leonardo Garrido and Katia Sycara.

*Winning the PC Shell Game*; K. F. Rudd, and J. D. Levy; Today's Office; Jan. 1989.

*An Automated Distributed Meeting Scheduler*; Sandip Sen; Department of Mathematical & Computer Sciences; University of Tulsa.

*Satistying User Preferences While Negotiating Meetings*; Sandip Sen, Thomas Haynes, and Neeraj Arora; Department of Mathematical & Computer Sciences; The University of Tulsa.

*A Formal Study of Distributed Meeting Scheduling*; Sandip Sen, and Edmund H. Durfee.

US 5,749,074, 05/1998, Kasso et al. (withdrawn)

* cited by examiner

FIG. 2

Calendar (10)

| OCTOBER 2001 - NOVEMBER | | |
|---|---|---|
| | WEB 31 | THU 1 |
| PDT | ZOE'S BIRTHDAY / HOLLOWEEN | GREAT AMERICA OFFSITE |
| | ☑ 2 TASKS DUE TODAY | |
| 10AM | NAVEL REVIEW BOARD WEEKLY INSPECTION / ROSENCRANZ / 10:30-11:30AM | ECLIENT STAF / BATCAVE / 9:30-10:30AM |
| 11AM | | |
| NOON | | |
| 1 PM | PRESENTATION COMMENTS TO PAUL IN HIS OFFICE | POSSIBLE COLLAB. W/ MICROSOFT /VADER'S LAIR / 1:00-2:00 PM |
| 2 PM | 1.1 WITH GREG 1; TITANIA / 8:00 | ENGINEERING REVIEW / PUMA / 3:00-4:00 PM |
| 3 PM | FACTORY CONFIG & DEPLOY ENGINEE... | |
| 4 PM | | |

TIME REQUESTS (12)

| LENGTH | FROM | TITLE |
|---|---|---|
| 1HR | BILL | BUDGET PROPOS... |
| 30 MIN | JIM | NEXT YEAR'S HIR... |
| 1 HR | SALLY | PROJECT XYZ |

METHOD AND SYSTEM FOR SCHEDULING A MEETING FOR A SET OF ATTENDEES VIA A SPECIAL ATTENDEE

BACKGROUND OF THE INVENTION

1. Technical Field

The invention relates to the scheduling of meetings. More particularly, the invention relates to a time request queue for scheduling a meeting with a hard-to-schedule person.

2. Description of the Prior Art

There are people in every organization with whom it is very difficult to schedule time. Typically, these people have administrative assistants that manage their time. Though group-scheduling software exists today, booking a meeting with these hard-to-schedule people typically requires contacting the administrative assistant by some alternate mechanism, such as telephone or email, and then requesting the meeting to be scheduled. This is not a big problem in isolation. But as many such meeting requests pile up, considerable time is spent by the administrative assistant in managing the requests and allotting time for each request. Should the scheduled time need to change, as it often does, a lot of time is spent trying to communicate the change of plans to those affected.

Currently, in group scheduling software a meeting organizer fills out a meeting request by proposing a date and time for the event to a list of attendees who, in turn, accept or decline the request. In all commercial group scheduling software today, the organizer is the only person who can set any detail of the meeting, i.e. the start time, the duration, the meeting title, the descriptive text, etc.

It would be advantageous to provide a group scheduling solution that offers an organized and formalized solution to the above described time management problem, in which the desired meeting includes one person who is difficult to schedule.

SUMMARY OF THE INVENTION

The presently preferred embodiment of the invention provides a group scheduling solution that offers an organized and formalized solution to the time management problem above mentioned, in which the desired meeting includes one person who is difficult to schedule. In the inventive approach, a scheduling system is provided in which a hard-to-schedule attendee takes over responsibility for setting the start time of an event.

In the invention, a workflow is provided as follows:
  The organizer sends a request to the hard-to-schedule person. The request preferably contains the desired duration of the meeting. The request may contain a list of attendees, location, and other details.
  These requests are maintained in a queue for the hard-to-schedule person. Batching requests in a queue is a key feature of the invention. The hard-to-schedule person, or their proxy, can then review these requests and select a suitable time for the meeting, set this time in a meeting request, thereby causing an update to be sent back to the organizer and the other attendees, thus indicating the appointed time for the meeting.
  The organizer of the meeting can still update the meeting details, etc. However, any changes in the start time or the duration of the meeting must be made by the hard-to-schedule person or their proxy.
  Note: The hard-to-schedule person can also decline the meeting entirely.

BRIEF DESCRIPTION OF THE DRAWINGS

FIG. 2 is an illustration of a screen display for a calendar and time request queue according to the invention.

DETAILED DESCRIPTION OF THE INVENTION

Figure 1:
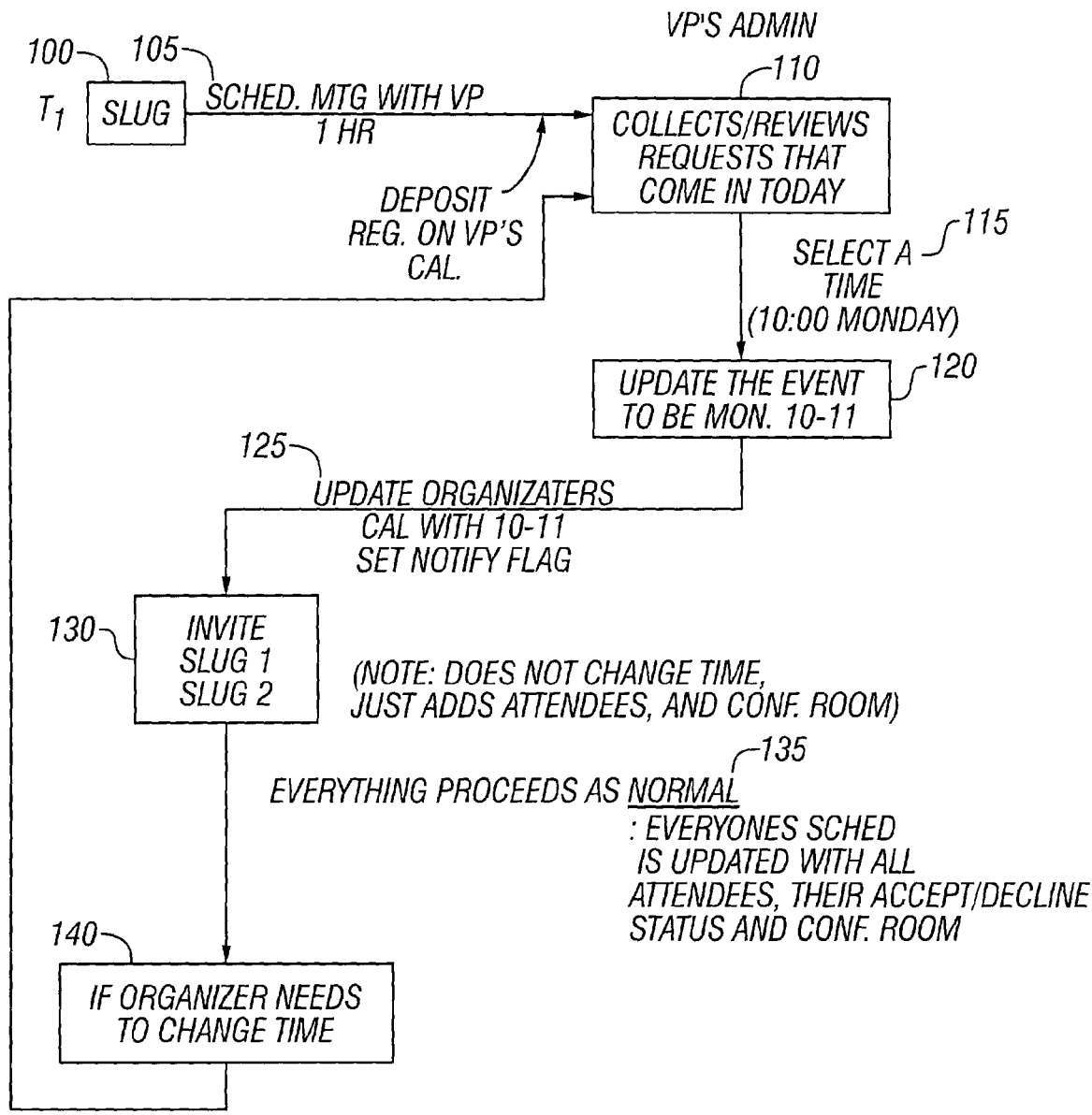
FIG. 1 is a flow diagram showing the scheduling of a meeting using a time request queue according to the invention.

The presently preferred embodiment of the invention replaces state of the art group scheduling software, in which a meeting organizer fills out a meeting request by proposing a date and time for the event to a list of attendees who, in turn, accept or decline the request, with a new approach in which the hard-to-schedule attendee takes over responsibility for setting the start time of the event.

FIG. 1 is a flow diagram showing the scheduling of a meeting using a time request queue according to the invention.

The preferred workflow is as follows:
  The organizer 100 sends a request to the hard-to-schedule person 105, e.g. a vice president of the company. The request must contain the desired duration of the meeting, e.g. one hour. The request may contain the list of attendees, the location, and other details.
  These requests are maintained in a queue for the hard-to-schedule person 110. The hard-to-schedule person, or their proxy, e.g. an administrative assistant, can then review these requests and select a suitable time for the meeting 115, e.g. 10:00 AM Monday, set this time in the meeting request 120, causing an update 125 to be sent back to the organizer and the other attendees indicating the appointed time 130.
  The organizer of the meeting can still update the meeting details, etc. 130, for example to add attendees or change the conference room location of the meeting, and the meeting can proceed as scheduled 135. However, any change to the start time or duration of the meeting 140 must be made by the hard-to-schedule person, or their proxy 110.
  The hard-to-schedule person can also decline the meeting entirely.

EXAMPLE

Step 1

Bill wants to set up a meeting with a couple of people on his team and with Joe, a hard-to-schedule vice-president. Bill goes into the calendar/scheduling program and creates the special time request. It is created very much like any other meeting, except that a specific start date/time is not set. Bill adds himself, his team, and Joe as attendees of the meeting. Bill indicates that the meeting will take one hour. Bill also marks Joe as a special attendee who can set the meeting time.

Step 2

After Bill creates the time request, it shows up on Joe's calendar. Time requests are collected and held until the attendee who can set the meeting time does so. FIG. 2 is an illustration of a screen display for a calendar and time request queue according to the invention. On the left side 14 of the screen 10 is a view of two days, though it could be any of a variety of schedule views provided by calendar applications, such as a day, a week, or a month. It is shown as a reference to what meetings are currently scheduled. On the right side 12 of the screen is a list of the time requests that have not yet been assigned a specific time. The list shows the length of time requested, the requester, and the title of the meeting. Bill's meeting is highlighted by clicking it. The meeting request could be dragged and dropped onto the left side of the screen to assign it to a particular time or it could be double-clicked to bring up a more detailed dialog box in which the time can be set. Once the time request has been assigned a timeslot, it moves out of the time requests list and into the schedule.

Step 3

Joe schedules the request for 11:30 on Wednesday, October 31. Once this is done, Bill is alerted that his time request has been scheduled. The meeting request now shows up in all the attendees' schedules at the appointed time.

Many variants of the invention are contemplated. For example, it is often the case that an administrative assistant handles the scheduling requests and manages the calendars of others. The time request queue can be managed by an administrative assistant. Another embodiment involves varying the specific details that the hard-to-schedule attendee can set. For instance, it may be that the in addition to the start time, the location for the meeting is also set by the hard-to-schedule attendee.

There are also other usage scenarios. For example, a person who wants to take his car in for a checkup. Typically, there are certain preferences that the repair shop has, such as the shop's hours of operation and/or workload, subject to some of the preferences of the person who is arranging to take in his car, such as the time of day of day of week. The invention is applicable to the scheduling of an appointment with the repair shop, or any other service. Thus, the person who desires an appointment for service need only submit a request to the time request queue, and an appointment is scheduled based upon the schedule of the service, or alternatively based upon the preferences of the customer. This could include such things as setting an appointment to get a hair cut, where the appointment must be Tuesday nights between certain times.

The invention seeks to satisfy the customer preferences and the service's schedule, relative to these criteria. Thus, the hard to schedule individual, for example a doctor, can set a time and/or place, but subject to various requirements of the requestor. In such case, the needs of both parties may not overlap and the meeting may not take place. In such case, the requestor may provide alternatives or may rank his preferences to help accommodate the needs of the difficult to schedule person. Further, the hard to schedule person may have some flexibility in his schedule and could provide the requester with one or more alternatives, such as different times, days, and/or locations. The invention also supports a collaborative agenda, where the hard to schedule person may receive a proposed agenda with the request, and in setting the meeting time and/or place, may include a revised agenda with the meeting notice sent to each attendee.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for scheduling a meeting for a set of attendees, wherein the set of attendees includes a special attendee and at least one additional attendee, the method comprising:

generating a meeting request from a meeting organizer, wherein the meeting request designates the special attendee as a recipient of the meeting request and wherein the meeting request does not specify meeting commencement information, the meeting commencement information comprising a start time and a date;

obtaining a selection by the special attendee of the meeting commencement information responsive to the meeting request, wherein the selection corresponds to acceptance of the meeting request and causes a calendar event to be placed on a calendar application of the special attendee;

causing transmission to the at least one additional attendee of an updated meeting request specifying the selected meeting commencement information, wherein the updated meeting request is acceptable by each at least one additional attendee to place a corresponding calendar event on a calendar application of the at least one additional attendee;

receiving a request for a modification, by the special attendee or a proxy of the special attendee, to the meeting commencement information, wherein the request comprises a change to the meeting commencement information that must be initiated by the special attendee or a proxy of the special attendee and cannot be initiated by the meeting organizer and the at least one additional attendee; and causing transmission to the meeting organizer and the at least one additional attendee of a second updated meeting request comprising the change to the meeting commencement information, wherein each of the steps is implemented by group scheduling software executed on a computer.

2. The method of claim 1, further comprising causing the meeting request to be displayed to the special attendee in a meeting request queue on a calendar application on a computer screen display.

3. The method of claim 2 further comprising causing at least one calendar view to be displayed to the special attendee adjacent to the meeting request queue on a calendar application on a computer display screen, the at least one calendar view providing a reference to a set of scheduled meetings including the start time and date of each scheduled meeting.

4. The method of claim 3, wherein the selection of the meeting commencement information comprises moving a graphical display object associated with the meeting request from the meeting request queue to another location on the computer display screen associated with the at least one calendar view to assign the meeting request to a date and a time.

5. The method of claim 4 further comprising causing display of the updated meeting request in at least one schedule view on a calendar application on a computer display screen for each of the at least one additional attendee automatically upon selection of the meeting commencement information by the special attendee.

6. The method of claim 5, wherein causing the display of the updated meeting request occurs automatically in response to movement of the graphical display object associated with the meeting request from the meeting request queue to another location on the single computer display screen associated with the at least one calendar view to assign the meeting request to a date and a time.

7. The method of claim 2, wherein the meeting request is to be displayed in the meeting request queue until the meeting commencement information is selected by the special attendee.

8. The method of claim 1, wherein causing transmission of an updated meeting request comprises automatically causing transmission of an updated meeting request in response to obtaining selection of the meeting commencement information by the special attendee.

9. The method of claim 8, wherein the updated meeting request is automatically caused to be transmitted without further interaction from the meeting organizer.

10. The method of claim 1, wherein the meeting request includes a duration of the meeting.

11. The method of claim 1, wherein the meeting request includes an identification of the set of attendees designated to attend the meeting.

12. The method of claim 1, wherein the meeting request includes a meeting agenda.

13. The method of claim 1, further comprising causing the display of the updated meeting request in at least one schedule view on a calendar application on a computer display screen for each of the at least one additional attendee automatically upon selection of the meeting commencement information by the special attendee.

14. The method of claim 1, wherein the special attendee is the only recipient of the meeting request.

15. In a messaging environment corresponding to a set of attendees, wherein the set of attendees includes a special meeting attendee and at least one additional meeting attendee, the at least one additional meeting attendee including a meeting organizer, a system comprising:
  a computer executing group scheduling software, wherein upon execution of the group scheduling software, the computer is operable to:
  generate a meeting request from the meeting organizer, wherein the meeting request designates the special attendee as a recipient of the meeting request and wherein the meeting request does not specify meeting commencement information, the meeting commencement information comprising a start time and a date;
  obtain a selection by the special attendee of the meeting commencement information responsive to the meeting request, wherein the selection corresponds to acceptance of the meeting request and causes a calendar event to be placed on a calendar application of the special attendee;
  cause transmission to the at least one additional attendee of an updated meeting request specifying the selected meeting commencement information, wherein the updated meeting request is acceptable by each at least one additional attendee to place a corresponding calendar event on a calendar application of the at least one additional attendee;
  receive a request for a modification, by the special attendee or a proxy of the special attendee, to the meeting commencement information, wherein the request comprises a change to the meeting commencement information that must be initiated by the special attendee or a proxy of the special attendee and cannot be initiated by the meeting organizer and the at least one additional attendee; and
  cause transmission to the meeting organizer and the at least one additional attendee of a second updated meeting request comprising the change to the meeting commencement information.

16. The system of claim 15, wherein the computer is further operable to cause the distribution of the meeting request, wherein causing the distribution of the meeting request comprises causing the meeting request to be displayed to the special attendee in a meeting request queue on a calendar application on a computer screen display.

17. The system of claim 16, wherein causing the distribution of the meeting request further comprises causing at least one calendar display to be provided to the special attendee adjacent to the meeting request queue on a calendar application on a computer display screen, the at least one calendar view providing a reference to an available start time and an available date associated with the special attendee and the meeting request queue providing a reference to only a set of non-scheduled meeting requests.

18. The system of claim 17, wherein the selection of the meeting commencement information comprises movement of a graphical display object associated with the meeting request from the meeting request queue to another location on the single computer display screen associated with the at least one calendar view to assign the meeting request to a date and a time.

19. The system of claim 18, wherein causing transmission of the updated meeting request comprises causing display of the updated meeting request in at least one schedule view on a computer display screen for each of the at least one additional attendee automatically upon selection of the meeting commencement information by the special attendee.

20. The system of claim 19, wherein causing the display of the updated meeting request occurs automatically in response to movement of the graphical display object associated with the meeting request from the meeting request queue to another location on the single computer display screen associated with the at least one calendar view to assign the meeting request to a date and a time.

21. The system of claim 16, wherein the meeting request is to be displayed in the meeting request queue until the meeting commencement information is selected by the special attendee.

22. The system of claim 15, wherein the computer is operable to cause transmission of the updated meeting request automatically in response to obtaining selection of the meeting commencement information by the special attendee.

23. The method of claim 22, wherein the updated meeting request is automatically caused to be transmitted to the at least one additional attendee without further interaction from the meeting organizer.

24. The system of claim 15, wherein the meeting request includes a duration of the meeting.

25. The system of claim 15, wherein the meeting request includes an identification of the set of attendees designated to attend the meeting.

26. The system of claim 15, wherein the meeting request includes a meeting agenda.

27. The system of claim 15, wherein the special attendee is the only recipient of the meeting request.

* * * * *